United States Patent
Baranov et al.

(10) Patent No.: US 8,000,848 B2
(45) Date of Patent: *Aug. 16, 2011

(54) INTEGRATED SYSTEM FOR AIRCRAFT VORTEX SAFETY

(75) Inventors: Nikolai Alekseevich Baranov, Moscow (RU); Andrei Sergeevich Belotserkovski, Moscow (RU); Mikhail Igorevich Kanevski, Moscow (RU); Igor Vladimirovich Pasekunov, Moscow (RU)

(73) Assignees: FAPRID, Moscow (RU); Spetsfekhnika, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 10/565,529

(22) PCT Filed: Jul. 25, 2003

(86) PCT No.: PCT/RU03/00334
§ 371 (c)(1),
(2), (4) Date: Jan. 23, 2006

(87) PCT Pub. No.: WO2005/010555
PCT Pub. Date: Feb. 3, 2005

(65) Prior Publication Data
US 2007/0103340 A1    May 10, 2007

(51) Int. Cl.
*G01S 13/93* (2006.01)
*G01S 17/93* (2006.01)
*G01C 23/00* (2006.01)

(52) U.S. Cl. .................... 701/14; 701/122; 340/968

(58) Field of Classification Search .............. None
See application file for complete search history.

(56) References Cited

U.S. PATENT DOCUMENTS

| 4,137,764 A | 2/1979 | Hallock et al. |
| 4,424,038 A | 1/1984 | Tingleff et al. |
| 5,657,009 A | 8/1997 | Gordon |
| 5,724,040 A | 3/1998 | Watnick |

(Continued)

FOREIGN PATENT DOCUMENTS

RU    2088487    8/1997

(Continued)

OTHER PUBLICATIONS

U.S. Appl. No. 10/565,531, filed Jul. 25, 2003, Baranov et al.

(Continued)

*Primary Examiner* — Michael J. Zanelli
(74) *Attorney, Agent, or Firm* — Preston Smirman; Smirman IP Law, PLLC (57) ABSTRACT

The invention relates to systems for preventing off-normal situations when there is a possibility that an aircraft penetrates into a dangerous area of the vortex shedding of a vortex generator. The inventive system consists of information sub-systems for recording and storing information on the expected relative position of the aircraft and trailing vortex areas in line with danger criteria which are specified by a user and concern dangerous aerodynamic forces and torques effecting the aircraft and induced by the trailing vortex of vortex generators, and for conveying said information to said user, who can be the aircraft crew and/or flight attendants, at a preventive distance from the aircraft and at a forecast moment. Said information can be visualised in a human-readable form and in a volume sufficient for forming a directive signal for carrying out a flight manoeuvre by the aircraft in order to move away from the dangerous trailing vortex area.

32 Claims, 4 Drawing Sheets

U.S. PATENT DOCUMENTS

| | | | |
|---|---|---|---|
| 6,133,867 A | 10/2000 | Eberwine | |
| 6,177,888 B1 * | 1/2001 | Cabot et al. | 340/968 |
| 6,184,816 B1 | 2/2001 | Zheng et al. | |
| 6,424,408 B1 | 7/2002 | Ooga | |
| 2002/0075171 A1 * | 6/2002 | Kuntman et al. | 340/961 |
| 2003/0222795 A1 * | 12/2003 | Holforty et al. | 340/968 |

FOREIGN PATENT DOCUMENTS

| | | |
|---|---|---|
| WO | WO 00/71985 | 11/2000 |
| WO | WO 2005/010554 | 2/2005 |
| WO | WO 2005/010848 | 2/2005 |

OTHER PUBLICATIONS

U.S. Appl. No. 10/565,527, filed Jul. 25, 2003, Baranov et al.

Hinton et al., "Development of a Wake Vortex Spacing System for Airport Capacity Enhancement and Delay Reduction"; The 19th Digitial Avionics Systems Conferences Proceedings, Oct. 7-13, 2000; vol. 1, pp. 3.E.6-1 thru 6-10.

* cited by examiner

INTEGRATED SYSTEM FOR AIRCRAFT VORTEX SAFETY

This U.S. national phase application is based on and claims priority to international application PCT/RU2003/000334 that designated the United States of America and of which the entire description and drawings are incorporated herewith by reference.

FIELD OF THE INVENTION

This invention deals with the methods and devices providing safety operation for aircraft, in particular observing precautions or prevention of contingency situation linked with the risk of aircraft penetration into the dangerous zone of disturbed air flow caused by another flying object, the so called 'wake vortex', generated by that object or appeared as a result of steady airflow about the flying object.

BACKGROUND OF THE INVENTION

The problem of providing safe aircraft flight is of current interest and includes a number of technological and organizational problems. One of such the problems is provision of safe flight when the determining factor is the aerodynamic influence of high level vortex turbulence, such as the wake vortices generated by another aircraft flying in the vicinity, as well as by the other objects, which undergo the airflows of high level of turbulence and vorticity.

It is well known that a moving aircraft generates wake vortices. An aircraft encountering wake vortices generated by another aircraft causes an important change in its angles of attack and slide. The aircraft is exposed the influence of air forces and moments that may throw it aside from the wake and while flying at low altitudes, for example during take-off and landing, such the factors may lead to hazard situations due to the failure of the aircraft to compensate the effect of such the forces by means of aircraft controls.

The appearance of aircraft with low aspect wings and with heavy wing loading causes the increase in wake vortex intensity that increases the danger for aircraft entering it.

A lot of research work on transport and decay of vortices shows that the ambient factors such as wind, windshift, stratification, and turbulence play an important role in these processes.

There is a potential opportunity to optimize the safety distances between aircraft during landing, take-off and cruise flight on the basis of plausible forecasting of wake vortex dynamics with due regard for now-casting of weather conditions and influence of atmospheric conditions, as well as for in-ground effects on the wake vortex dynamics.

One of the main trends for decision of this problem is the development of on board computer systems working in real time, determining the hazard level of aerodynamic influence on the aircraft, and permitting choice of the way of further correction of aircraft flight control aiming to compensate effectively such the aerodynamic perturbations.

Another task, which may be called an informational one, is the provision of the pilot with information on the location of wake vortices and the aircraft position with respect to wake vortices within the prediction period of time.

The method and device for visualization of wake vortices on a display on the basis of mathematical modeling taking into account the vortex generator aircraft and current weather data are well known. According to the technical solution, the device uses a fast-response display where simulated wake vortices generated by aircraft and located in the vicinity of the protected aircraft (U.S. Pat. No. 5,845,874, A) are visualized. However, in the case when there are many aircraft in the protected aircraft vicinity, for example near the aerodrome, the display will show a great number of simulated wake vortices, and it will be very difficult to identify which wake vortices are of real danger for the aircraft and which could be ignored.

One of the most perspective ways to increase the flight safety is to provide the pilot in real time with forecasted positions of wake vortices, entering into which may cause an incident.

The warning system against wake vortex turbulence is well known. The system is designed for onboard installation. It informs the aircraft crew on potential entry into wake vortices of another aircraft only when the system evaluates that the entry may occur after a certain period of time (U.S. Pat. No. 6,177,888, A). The system provides the mutual coordination of the both aircraft, exchange of warning signals and of information on the current altitude, distance and bearing, as well as tracking the wake vortex path with due regard for the local wind speed. The system determines the distance or the time before the aircraft enters into the wake vortices of another aircraft and indicates the aircraft approach to wake vortices when the distance or the time become less than the preset threshold. The width and the height of the wake vortex volume are calculated in each point of a set of points over the wake vortex path in the form of a function of distance from the given point to the neighboring aircraft.

However this system does not solve the problem of provision of the pilot with information on the hazard level when entering wake vortices and does not suggest the aircraft maneuver to avoid the entrance in wake vortices.

Moreover, the variety of aircraft flight conditions requires reduction of distances between aircraft, for example during the consecutive take-off or landing at aerodromes, which is very important for the increase of aerodrome capacity.

The reliable knowledge of position and structure of wake vortices and their effect on aircraft at the forecasted time will contribute to meet conflicting requirements for increase of flight efficiency and safety.

The warning system for wake vortices is well known. The system is designed for onboard installation and alerts the pilot on the predicted danger of another aircraft presence in the aircraft vicinity (U.S. Pat. No. 6,211,808, B1). The system consists of a spherical antenna made of dielectric material with eight sectors having receivers for detection of microwave signals reflecting from other aircraft. However the system is rather expensive and does not provide the pilot with information on the occurrence of hazardous air perturbations.

There exists the technical solution with respect to the scheme and method of preventing intersection of an aircraft with wake vortices of another aircraft (WO 00/71985). The solution requires determination of the position, geometry and structure of wake vortices generating by another aircraft, the presence of which is determined by means of information received from an airborne system of the first aircraft, from information received from another aircraft or from the aerodrome. The solution also requires determination of another aircraft altitude, forecasted position of another aircraft wake vortices with due regard for the ambient conditions, particularly the wind velocity and direction, air temperature, purification of the received data with the reference table, or modeling wake vortices with visualization of their location and path with respect to the first aircraft, forecasting the intersection point of the wake vortex path and the first aircraft trajectory, applying an alarm signal in the case where such crossing can occur. In general, the method is used to provide safety flight of two aircraft in the airport area. Its implementation can lead to the increase of the flight altitude for the first aircraft over the second one. The method uses the Traffic Collision Avoidance System. However, the first aircraft pilot receives the visualization of information on all vorticity areas in the flight area due to the presence of the second aircraft. Hence this situation does not give the true hazard picture of wake vortices to the pilot.

It is well known that the NASA, USA pays great attention for improving the terminal area efficiency, in particular during aircraft take-off and landing; and one of the research work trends is the implementation of the AVOSS (Aircraft Vortex Spacing System) that combines outputs of different systems and elaborate dynamic criteria of the safe wake vortex separations depending on weather conditions ($37^{th}$ Aerospace Sciences Meeting & Exhibit, Jan. 11-14, 1999, Reno, Nev., NASA Langley Research Center, Hampton, Va.). This system represents the current and forecasted weather conditions, models of transport of wake vortices and their decay in these weather conditions from the ground to the altitude of take-off and landing glidepath, as well as feedbacks the wake vortex behavior in real time. The wake vortex behavior is compared with the a priori determined sizes of the safety corridor and calculated data on the wake vortex decay. The result is the required safe aircraft separations. If wake vortices stay longer than it is expected, the reduction of the standard separations is prohibited. The wake vortex behavior is calculated for a number of 'windows' from the altitude of the glide path to the runway threshold.

However, this system has a number of restrictions such as: the lack of account of the altitude windshift, which may prevent wake vortex descent or originate wake vortex raising; the lack of account of a specific turbulence scale necessary for correct wake vortex decay modeling, and some other, which may lead to abnormal situations due to inconsistency of the calculated wake parameters provided to the flight controller with actual wake vortex parameters.

Moreover, the AVOSS implementation will lead to the increase of the load on the flight controllers that suffer heavy emotional burden due to intensification of their labor and can create undesirable risk of taking incorrect decisions.

One should bear in mind that foreign safety systems are mainly directed to the use of the so called 'Instrument Flight Rules' when aircraft flight control is carried out on the basis of the commands made by a flight controller and realized in the director or automatic mode.

However, the most critical juncture in the activity of flight controllers is making correct decisions in an emergency situation. There are two stages in that process: identification of the situation and determination of activities aiming to eliminate the emergency situation. Preliminary to each of activities, the flight controller should envisage the further steps. The perception of visual and voice signals in the verbal form from the long-term memory, from the display medium, or aurally needs a certain time under time deficiency. The time for perception of graphic symbols is far less and identification of the situation with indication of separate image zones permits to improve the decision adequacy.

Moreover, the effect of such a physical factor as acceleration causes the detraction of brain circulation of the pilot and can even force a brief loss of consciousness under emotional and nervous tension. Therefore, the rational way to solve the problem is the beforehand provision to a pilot or a flight controller of information in graphical symbols necessary for making a decision.

SUMMARY OF THE INVENTION

The goal of the invention is the development of a safety system for aircraft flying under conditions of risk of entering wake vortices generated by other aircraft, ground objects, as well as sea mobile and immobile objects located in the vicinity of a flying aircraft including take-off and landing regimes.

The assigned task for creation of this invention was the development of the integrated vortex safety system, which informs the user about the presence in the vicinity of the aircraft of wake vortices generated by different objects, which may cause danger for the aircraft according to the danger criterion chosen by the user. The system should also inform the user about the geometrical parameters of the wake vortex danger areas, which entering may cause an incident. Another feature of the system is to prompt the pilot or other users that have a possibility to influence the aircraft flight to create a control signal ensuring the aircraft safe evasive maneuver.

The assigned task has been fulfilled by the development of the Integrated System for Aircraft Vortex Safety, which includes the following:

a aircraft information subsystem, which is able to fix, save, and provide the user with information concerning the aircraft position;

a wake vortex information subsystem, which is able to fix, save, and provide the user with information concerning wake vortex generators located in the aircraft vicinity;

a environmental information subsystem, which is able to fix, save, and provide the user with information concerning environmental conditions in the vicinity area of the aircraft at the current and forecasted time;

a warning subsystem alerting the users against the possibility of the aircraft encountering with wake vortex danger areas generated by a vortex generator at the forecasted time chosen by the users;

a user subsystem capable at least of fixing, saving, and indicating information received from other subsystems for the user and forming a signal recommending the aircraft evasive maneuver during the chosen by the user period of time after the warning, received by the user, on the possibility of entering the vortex generator wake vortex danger area at the forecasted time;

a communication subsystem providing the integration of the subsystems in a single complex.

Moreover said integrated system, according to the invention, comprising:

the aircraft information subsystem providing receipt, processing, saving, and transmitting information to the warning subsystem at least on the aircraft configuration, coordinates and attitude in the inertial frame, on the aircraft velocity and angular rate components in the aircraft frame;

the vortex generator subsystem providing processing, saving, and transmitting information to the user at least on the vortex generator type, coordinates and attitude, flight velocity and angular rate components in the inertial frame;

the environmental information subsystem providing processing, saving, and transmitting information to the user at least on the wind velocity components in the inertial frame at different altitudes in the region of the wake vortex presence, as well as on the ambient turbulence;

the warning subsystem informing the user on a possibility of the aircraft encountering with the vortex generator danger areas which performs at least calculation of the vortex generator wake vortex danger area position and intensity, the area of the aircraft forecasted positions at the forecasted time and sends to the user subsystem information on a possibility of the aircraft encountering with the vortex generator wake vortex danger areas at the forecasted time;

the user subsystem receiving, processing, saving and indicating the information from the warning subsystem at least on the nulling of the distance from the area of the aircraft forecasted positions to the vortex generator wake vortex danger area at the forecasted time and forms a signal indicating the change of the aircraft position providing the increase of the above mentioned distance.

Moreover, according to the invention, it is appropriate that the integrated system should be implemented as follows:

said aircraft informational subsystem is realized on the basis of the aircraft standard onboard equipment and/or equipment of ground-based, seaborne and/or aerospace navigation complexes;

said vortex generator informational subsystem is realized on the basis of the aircraft standard onboard equipment and/or the vortex generator standard equipment, and/or equipment of the air traffic control for ground, sea, or aerospace complexes;

said environmental information subsystem is realized on the basis of the aircraft standard onboard equipment and/or of standard meteorological equipment for the air traffic control system or of equipment in the ground-based, sea and/or aerospace navigation complexes;

said warning subsystem informing the user on the possibility of the aircraft encountering with the vortex generator wake vortex danger areas is realized on the basis of the user computer software and/or onboard unified indication systems and/or indication systems of air traffic control services or ground-based equipment in seaborne and/or aerospace navigation complexes at the site of the flight controller;

said user subsystem is realized on the basis of software of the user computer software and/or of the aircraft onboard standard equipment and/or ground-based or seaborne navigation complexes at the site of the flight controller;

said commutation subsystem is realized on the basis of data-transmission communication systems and/or onboard multiplex channels of informational exchange.

According to the invention, a user of the integrated system can be an aircraft and the realization of the recommendation signal can be performed by the aircraft crew or by the aircraft automatic flight system.

Moreover, according to the invention, a user of the integrated system can be an air traffic control service; when the recommendation signal is transmitted to the aircraft crew, and the crew or aircraft automatic control system can realize the signal.

According to the invention, it is appropriate that the integrated system should comprise the following subsystem as a warning subsystem informing of the possibility of the aircraft encounter with the vortex generator wake vortex danger area at the forecasted time, which includes:

a aircraft tracker capable of receiving information on the aircraft configuration, position, coordinates, and attitude in the inertial frame at the current time;

a vortex generator tracker capable of receiving information on the vortex generator position, geometrical and weight characteristics, as well as on the motion parameters in the inertial frame at the current time;

a memory unit capable of saving information on the vortex generator position and motion parameters in the inertial frame;

a ambient parameter detector capable of receiving information on the environmental parameters in the space of the collocation of the aircraft and vortex generator at the current time;

a wake vortex tracker capable of determining the vortex generator wake vortices in the form of the set of the vorticity center paths in the inertial frame;

a device for selection of the delay time capable of calculating the time period within which the aircraft has at least a possibility of a flight evasive maneuver providing evasion of the aircraft from the generator wake danger area after the signal warning against the possibility of wake encounter has been received;

a device for simulation of the control plane capable of calculating the delay distance, which equals to the distance covered by the aircraft during the delay time, modeling the control plane situated in front of the aircraft perpendicular to its flight direction at the delay distance, and determining the forecasted time necessary for the aircraft to gain the control plane in the inertial frame;

a device for determination of the danger area parameters capable of determining the geometrical characteristics of the generator wake vortex danger areas in the form of the set of the danger areas of the generator vorticity regions at the forecasted time;

a forecasting device capable of determining the generator wake path in the form of the set of the generator vorticity region centers with respect to the inertial frame and of the intensity of the generator wake vortices at the forecasted time;

a device for calculation of the intersection points capable of determining the coordinates of the intersection points of the generator wake vortex trajectory and the control plane at the forecasted time of the aircraft flight through it;

a areas and regions forming device capable of forming around the intersection point of the wake vortex path and the control plane of the wake vortex danger area in the form of the set of the generator vorticity danger areas, where the entering aircraft may have the flight parameters exceeding the admissible limits; forming in the control plane of the area of the aircraft forecasted positions at the forecasted time of the aircraft intersection with the control plane with due regard to the flight regulations; forming around the region of the aircraft forecasted positions of the alert area; the information on the entrance of the wake danger areas into the alert area is provided to the user;

a transformation unit capable of calculating the coordinates of the area of the aircraft forecasted positions, of the alert area and of the wake vortex danger area in the aircraft frame;

first intersection conditional test unit capable of calculating the distance from the alert area to the wake vortex danger area and marking its nulling;

second intersection conditional test unit capable of calculating the distance from the area of the aircraft forecasted positions to the wake vortex danger area and marking its nulling;

first indication unit capable of forming and transmitting the nulling signal for the distance from the area of the aircraft forecasted positions to the vortex generator wake vortex danger area;

second indication unit capable of indicating the nulling of the distance from the alert area to the vortex generator wake vortex danger area.

It is appropriate that the system according to the invention has the following features:

said aircraft parameters tracker is capable of receiving information at least on the aircraft configuration, coordinates, flight velocity, pitch, yaw, and roll angles;

said vortex generator tracker is capable of receiving information at least on the vortex generator type, flight velocity, angular rates, and coordinates of the generator path points;

said ambient parameters detector is capable of receiving information at least on the magnitude and direction of the local wind velocity, the altitude wind profile, ambient turbulence intensity, and the underlying terrain type;

said wake vortex tracker is capable of determining the vortex generator wake vortex path in the form of the set of the generator vorticity area centers and the wake vortex intensity on the basis of the saved information on the vortex generator type, velocity, angular rates, and coordinates of the generator path points;

said device for simulation of the control plane is capable of modeling the control plane on the basis of the information on the aircraft position, attitude, velocity, and the delay time;

said device for determination of the danger area parameters is capable of determining the geometrical characteristics of the generator wake vortex danger areas on the basis of the saved information on the trajectory point coordinates and intensity of the generator wake vortices, as well as of the information on the aircraft configuration, position, velocity and angular rates in the inertial frame;

said forecasting device is capable of determining the vortex generator wake vortex path and intensity on the basis of the information on the wake path in the form of the set of the trajectories of the generator vorticity region centers in the inertial frame and of the wake intensity;

said device for calculation of the intersection points is capable of determining the coordinates of the intersection points of the generator wake vortex trajectory and the control plane on the basis of the information on the coordinates of the control plane and the wake vortex trajectory in the inertial frame at the forecasted time;

said areas and regions forming device is capable of forming the wake vortex danger area, area of the aircraft forecasted positions and the alert area on the basis of the information on the coordinates of the intersection point of the generator wake vortex path and the control plane at the forecasted time, of the information on the geometrical characteristics of the danger area in the form of the set of the generator vorticity danger areas, of the information on the aircraft position, attitude, velocity and angular rates with due regard for the flight regulations in the inertial frame;

said transformation unit is capable of calculating the coordinates of the area of the aircraft forecasted positions, of the alert area, and of the wake vortex danger area in the aircraft frame on the basis of information on the coordinates of the area of the aircraft forecasted positions, of the warning area, and of the wake vortex danger area, as well as of information on the aircraft coordinates and attitude, preferably on the pitch, yaw, and roll angles in the inertial frame at the current time.

Moreover, according to the invention, it is appropriate that said warning subsystem in the integrated system comprises the vortex generator tracker, memory units, wake vortex tracker, unit for evaluation of the danger area parameters, device for evaluation of the danger area parameters, forecasting device, unit for calculation of intersection points, forming areas and regions unit, transformation unit, first and second intersection conditional test units, and signal units capable of simultaneously functioning with respect of each of the vortex generators located in the vicinity of the aircraft.

Moreover, it is desirable that said device for selection of the delay time in the integrated system, according to the invention, is realized with the possibility of the current correction of the delay time.

Moreover, it is desirable that said forming areas and regions unit, according to the invention, is realized with the possibility of the current correction of the area of the aircraft possible positions.

Moreover, it is desirable that said forming areas and regions unit, according to the invention, is realized with the possibility of the current correction of the alert area.

Moreover, it is desirable, according to the invention, that the current correction of the delay time, current correction of the area of the aircraft forecasted positions, and the current correction of the alert area could be performed in the manual mode.

Moreover, it is desirable, according to the invention, that the above correction can be performed in the semiautomatic or automatic mode.

Moreover, it is desirable, according to the invention said integrated safety system comprises a unit for visualization for the user information on of the aircraft position and the vortex generator wake vortex danger areas.

Moreover, it is desirable that said user subsystem comprises a indication unit and a warning indication unit chosen from a group containing visual, audio, and tactile indication units.

It is desirable, according to the invention, that said integrated system comprises the device for determination of the danger area parameters comprising:

a unit for the aircraft schematization capable of calculating the set of the aircraft geometrical characteristics necessary for evaluation of additional aerodynamic forces and moments induced by the generator wake vortices and acting on the aircraft on the basis of information on the aircraft configuration, coordinates, flight velocity, angles of pitch, yaw, and roll;

a unit for evaluation of additional aerodynamic forces and moments acting on the aircraft at the given point and induced by the generator wake vortices, capable of calculating them on the basis of the saved information on the paths of the wake vortex points in the form of the sets of the trajectories of the vorticity area centers and the intensity of the generator wake vortices in the inertial frame, of the information on the aircraft configuration, position, flight velocity, angular rate in the inertial frame, and on the aircraft geometry;

a unit for estimation of the hazard level of the aerodynamic perturbations at the given point capable of estimating the hazard level on the basis of criteria chosen by the user;

the unit for determination of the points where the aircraft aerodynamic forces and moments induced by the generator wake vortices are dangerous capable of determining the coordinates of the points of the danger areas on the basis of their selection under the hazard criteria chosen by the user;

a unit for evaluation of the geometrical characteristics of the wake vortex danger areas capable of calculating them on the basis of information on the coordinates of points of the danger areas.

According to the invention, in said warning subsystem, said unit for evaluation of the geometrical characteristics of the wake vortex danger areas is capable of approximating the danger area boundary.

It is preferable, according to the invention, to choose in the integrated system the admissible aircraft moment of roll induced by the vortex generator wake vortices.

Moreover, according to the invention, in said integrated system the roll moment of the aircraft induced by the vortex generator wake vortices can be chosen as the hazard criterion It is preferable, according to the invention, said wake vortex tracker and forecasting unit in the integrated system comprise a programmable component; and said unit for evaluation of the geometrical characteristics of the wake vortex danger area is realized in the software of the programmable component.

According to the invention, the devices and said units of the integrated system can have different localization.

Moreover, according to the invention, said integrated system can comprise a system for saving information at least on the delay time, control plane coordinates, area of the aircraft forecasted positions, and vortex generator danger areas at least within the period of emergency indication of the nulling of the distance from the area of the aircraft forecasted positions to the vortex generator wake vortex danger area.

BRIEF DESCRIPTION OF THE DRAWINGS

The invention illustrates on the example of its embodiment and by the enclosed drawings as follows.

DESCRIPTION OF THE PREFERRED EMBODIMENTS OF THE INVENTION

The invention can be illustrated by a version of implementation, which does not restrict or limit its application. The scheme is presented in FIG. 1 for the version where the user is an aircraft (hereinafter A/C) flying in the vicinity of an airport and another aircraft flies near by generates wake vortices (hereinafter Vortex Generator or VG). The aircraft is equipped with the navigation system providing measurements of navigation and flight parameters for the own and other aircraft.

Aerodrome navigation equipment consists, for example, of the following: the complex containing international radio system of near navigation VOR/DME (the VOR radar measuring the distance), which is the standard equipment for operation on the foreign airlines for automatic continuous determination of the aircraft position (the range up to 370 km and the coverage)0-40°, automatic finder for indication of the aircraft bearing, for example of the ARP-7S type, and the homer, for example of the APR-8 type, providing flight operations of aircraft equipped with automatic direction finders.

Figure 1:
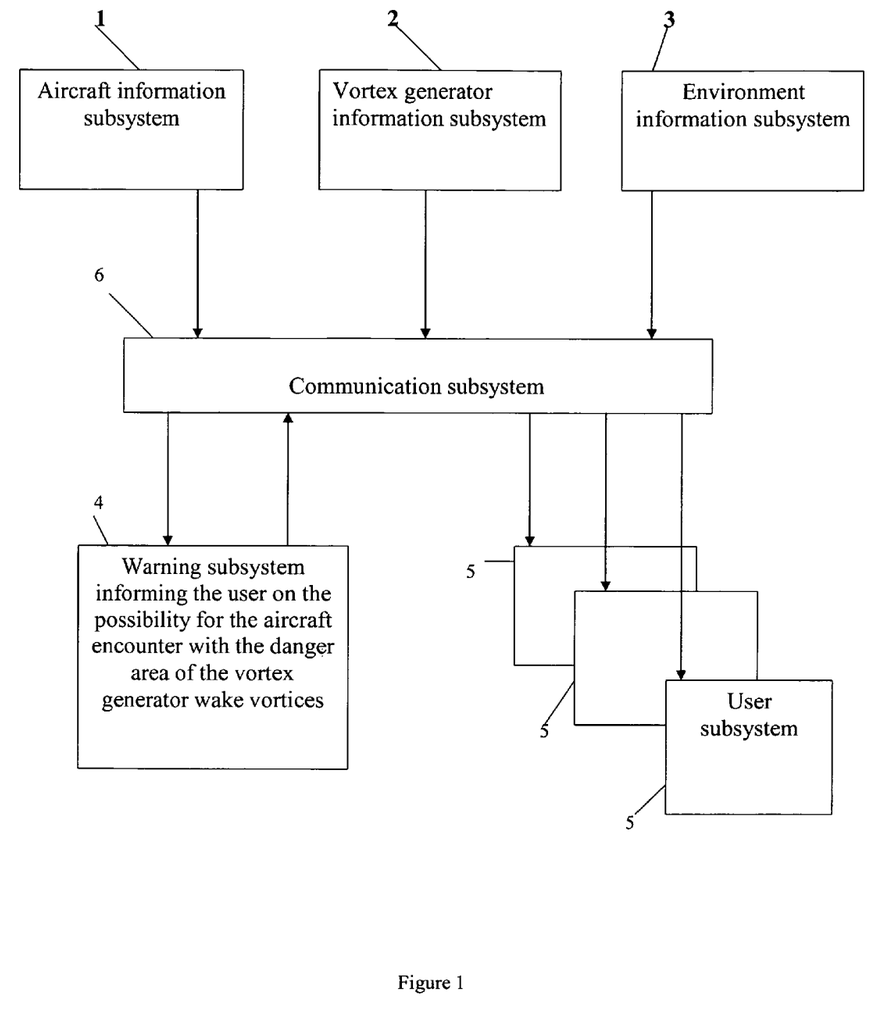
FIG. 1 is the scheme of the informational flows of the integrated vortex safety system, according to the invention, a version.

FIG. 1 exhibits the scheme of informational flows of the integrated vortex safety system for aircraft, according to the invention, a version where the aircraft subsystem 1 preserves information on the aircraft, the vortex generator subsystem 2 (hereinafter the VG) and the environmental subsystem 3 are realized in the above mentioned flight and navigation complex, and partially on the basis of the aerodrome equipment. These systems fix, save and transmit to other subsystems of the integrated vortex safety system, according to the invention, the information on the aircraft angles of attack and sideslip, angular rates, deflection of the aircraft controls, the engine mode, overloads in the aircraft frame, indicated airspeed, acceleration, attitude angles and velocity vector in the inertial frame, position coordinates, radar meteorological data, type of the underlying terrain, location of vortex generators and also information on the location of other wake vortex generators, their forms, dimensions, velocity and altitude, the altitude wind profile, types of wake vortex generators, their paths points coordinates, and their geometry and weight data.

The warning subsystem (4) informing the user about the eventual penetration of the aircraft into the vortex generator danger area is realized on the basis of the aircraft flight and navigation system and the aircraft computer system. The user subsystem (5) is realized on the basis of the aircraft computer system, indication and visualization systems, for example of the head display system. The commutation subsystem (6) is realized on the basis of multiplexing onboard information channel.

Figure 2:
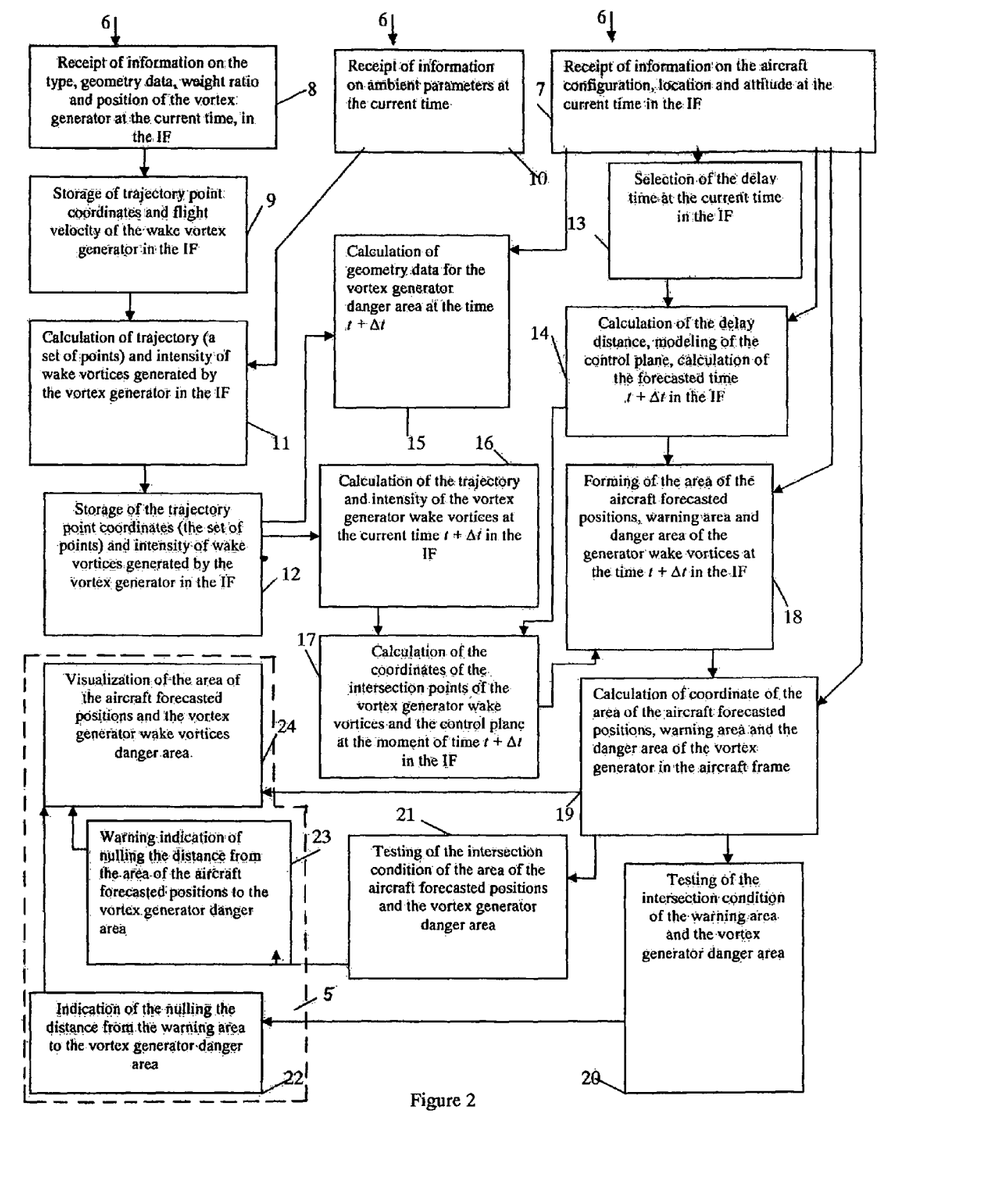
FIG. 2 is the scheme of the realization of the warning subsystem informing the users about a possibility of the aircraft encounter with the vortex generator wake vortex danger area in conjunction with the part of the user subsystem, according to the invention, a version.

According to the invention, the warning subsystem (4) and part of the user subsystem (5) including visualization system are realized according to the scheme shown in FIG. 2. The warning subsystem (4) on the basis of information received from subsystems 1, 2, and 3 calculates the paths of wake vortices located in the vicinity of the aircraft as the set of the vorticity wake vortex center path points, determines the geometry data of the VG wake vortex areas, meeting the requirements of the hazard criteria assigned by the user, for example the A/C roll angle under the forecasted effect of wake vortices at the forecasted time when the A/C intersects some simulated control plane surface located in front of the A/C perpendicular to its flight trajectory at the predicted distance from the A/C; forms information on the possible forecasted location of the aircraft and the wake vortex danger areas in the control plane, evaluates the hazard level for the aircraft and tracks the distance between the danger area and the A/C in real time.

The user subsystem (5) informs the pilot on the forecasted event of the entering into the danger area by means of sound, tactile, or visual indication and provides visualization of that information for the user, forming the required signal, for example a sound signal. In case subsystem 5 is located also at the flight controller site, that information can be duplicated permitting the flight controller to concentrate his attention on making correct decision.

According to the scheme shown in FIG. 2, in the warning subsystem (4), the A/C parameter tracker (7) receives through the communication subsystem (6) information from subsystem (1) concerning the aircraft, particularly, according to the invention, on the A/C configuration, coordinates, flight velocity, angle rates, angles of pitch, yaw, and roll at the current time in the inertial frame.

The wake vortex generator tracker (8) receives through the communication subsystem (6) from subsystem (2) information on wake vortex generators and saves in the memory device (9) the information on the VG type, flight velocity, angular rates, and trajectory points in the inertial frame.

The environmental parameters detector (10) receives through the communication subsystem 6 from subsystem 3 the environmental information, for example from the aircraft air data system or from a flight officer information on the local wind speed and direction, altitude wind profile, degree of turbulence, underlying terrain type in the collocation area of the A/C and VG with respect to the inertial frame at the current time, t.

The wake vortex tracker 11, on the basis of information received from the memory unit 9 calculates the path and intensity of the VG wake vortices as the set of the vorticity centers in the inertial frame, for example by means of the algorithms for example, by means of the well known algorithm for calculation of the wake vortex path and intensity Northwest Research Association, Inc., the Aircraft Vortex Spacing System (AVOSS), Algorithm Version 3.1.1), which provides calculation of the centers of vortices area paths on the basis of integrating of a differential equation describing vorticity are evolution in space and time, or using other algorithms providing the said calculations. The memory unit 12 saves these data. The vorticity area coordinates may also be determined by instrumental measurements, for example by means of laser radars (lidars), by means of measurement and estimation of the air flow tangential velocities with further calculations of the path and intensity of wake vortices. The device 13 chooses the delay time necessary for the A/C evasive maneuver. The delay time, according to the invention, may be corrected in the current mode by means of manual, semiautomatic, or automatic control with due account for, for example the pilot skills or the features of the flight task. The control plane (hereinafter the CP) simulation unit 14, on the basis of information received form device 7 on the A/C coordinates, flight velocity, angles of pitch, yaw, and roll and of information on the chosen delay time, $\Delta t$, received from device 13 simulates the CP located in front of the A/C perpendicular to its trajectory at the delay distance from the A/C, for example in the form of coefficients of the CP in the IF and determines the forecasted time t+$\Delta t$ when the A/C flights through the CP. Any calculation device capable of performing such the calculations, for example the A/C onboard computer, can be used as the unit 14. The forecasting device 15, on the basis of information on the VG wake vortex path and intensity saved in the device 12 and on the forecasted time from the simulation device 14, calculates the VG wake vortex path coordinates and intensity in the form of the set of the vorticity center paths at the forecasted time in the IF. The danger area parameters evaluation device 16 determines on the basis of information received from the device 7 on the A/C coordinates, flight velocity, and angular rates and of information from the memory unit 12 on the VG wake vortex path points coordinates and intensity in the form of the set of the VG vorticity area center paths, determines the GV wake vortex danger area geometry data according to the chosen hazard criterion in the form of the set of the VG vorticity danger areas at the forecasted time t+$\Delta t$. According to the invention, the A/C admissible roll or the admissible value of the A/C roll moment induced by the VG wake vortices, for example, may be chosen as the hazard criterion.

According to the invention, the wake vortex tracker 11 and forecasting device 15 can contain a programmable component capable of calculating, for example, the VG wake vortex path and intensity and the device 16 may be realized in software of this component, that is, in the database for calculated geometry characteristics of wake vortex danger areas for VG of different types depending on different environmental conditions and VG motion, aerodynamic forces and moments induced on the A/C by wake vortices of different intensity, for example the A/C rolling moment.

The device 17 (FIG. 2) realized, for example in the A/C flight instrument system, on the basis of information on the CP coordinates calculates the intersection points of the VG wake vortex path and the CP at the forecasted time t+$\Delta t$ based on information on the CP coordinates received from the device 14 and on information the wake vortex path from the device 15, for example by selection of the two wake vortex path points located on the both sides of the CP with interpolation of the distance between them.

The areas and regions forming device 18, for example as a part of the computer of the A/C inertial navigation system, forms around the intersection point of the VG wake vortex path and the CP the wake vortex danger area; the area of the aircraft forecasted positions (hereinafter the AAFP) with due regard for flight rules and regulations at the forecasted time t+$\Delta t$ and the warning area (hereinafter the AA) as a set of points on the control plane. According to the invention, the device 12 provides the current correction of the coordinates of the AAFP and AA, which is important for the pilot in coordinating evasive maneuvers with due regard for the flight situation.

The transformation unit 19 calculates the coordinates of the AAFP, the VG wake vortex danger areas, and the AA the A/C frame.

Then the first unit 20 for testing the intersection condition calculates the distance from the AA to the wake vortex danger area tracking the nulling event for it and the second unit 21 for testing the intersection condition calculates the distance from the AAFP to the wake vortex danger area tracking the nulling event for it.

The nulling information on the both events at the forecasted time is provided to the user subsystem 5 and is directed to the devices 22 and 23, for example to the device 22 (audio indication) in case of nulling of the distance between the AA and the wake vortex danger area, and then, for example to the device 23 of the pilot alarm tactile indication in case of nulling of the distance between the AAFP and the wake vortex danger area. The tactile indication should provoke the pilot to take urgent measures for the A/C evasive maneuver. The pilot has the time at his disposal to undertake flight evasive maneuver calculated by the CP simulation device 14 with due regard for the A/C velocity and the delay distance. Depending on the current situation after the receipt of the fist indication signal from the device 22, the pilot may correct the delay time, for example by means of manual control setting a discrete value, semiautomatic control with transition to another value or automatic regulation in case of the criterion setup, i.e. a conditions for increase or decrease of the delay time value. The indication terminates with increase of distances.

According to the invention, it is appropriate to visualize information for the user on the mutual position of the AAFP and the danger area in the CP at the forecasted time in the visualization device 24, for example on a display, on the windshield indicator, or on the A/C navigation chart, as well as for limitation of the information volume not relevant for the pilot; and to visualize the danger areas only after their intersection with the AA.

Figure 3:
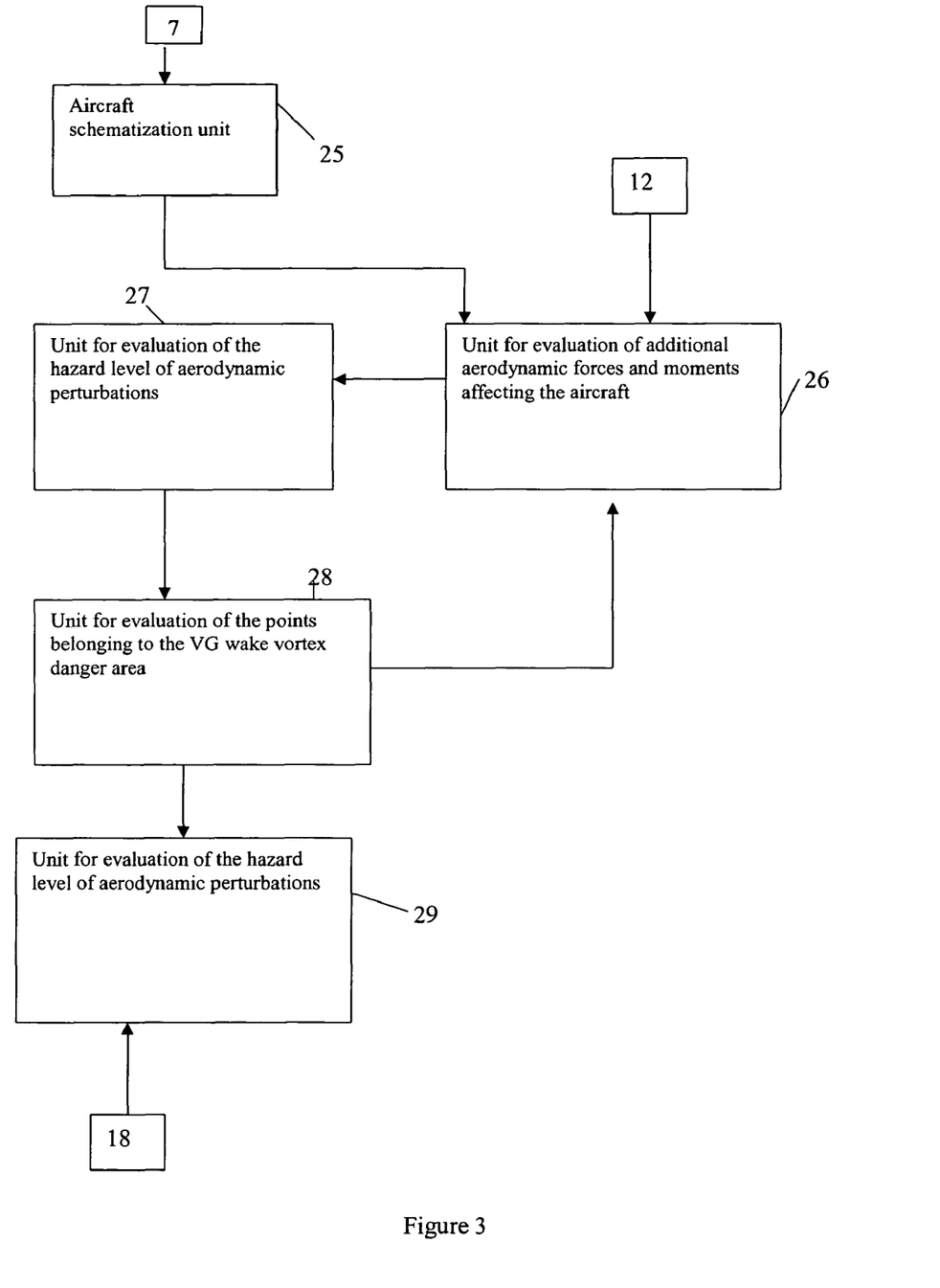
FIG. 3 is the scheme of the realization of the unit for evaluation of the geometrical characteristics, according to the invention, a version.

According to the invention, the device 16 for evaluation of the danger area parameters can be implemented as it is shown on the scheme of FIG. 3 and may contain the A/C schematization unit 25 receiving information from the device 7 of the warning subsystem 4 realized by means of any known methods and calculating the set of the A/C geometrical parameters with due regard for the A/C configuration; the unit 26 which receives information from the unit 25 and information from the device 12 of the warning subsystem 4 and evaluating additional aerodynamic forces and moments, induced by the VG wake vortex at the appropriate point. Then the unit 27 determines the hazard level of aerodynamic perturbations at the given point on the basis of the given hazard criterion, the unit 28 determines points belonging to the wake vortex danger area; and the unit 29 determines the geometrical characteristics of the danger area as the set of the points and approximates the danger area boundaries for simplification of visualization of the danger area at the display. Then the information on the VG wake vortex danger area sends to the device 18 of the warning system and is visualized when a risk exists for the A/C entering the danger area.

Figure 4:
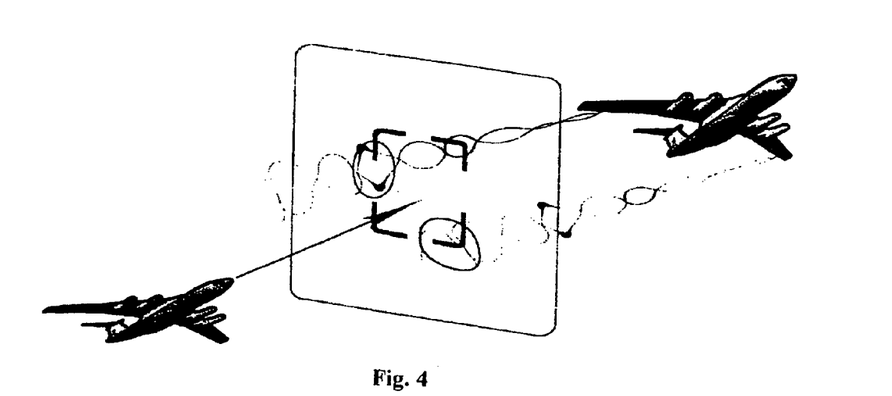
FIG. 4 is the schematic of information visualized in the user subsystem, according to the invention, a version.

FIG. 4 demonstrates the scheme of the location of the control surface simulated in the user warning subsystem 4 located, for example on the A/C board, and of the VG wake vortices. However, the subsystem 4 may be located also at the flight controller site, for example at the aerodrome or on board of the ship, and the pilot can only be provided with the information visualized by means of the airborne visualization devices.

Figure 5:
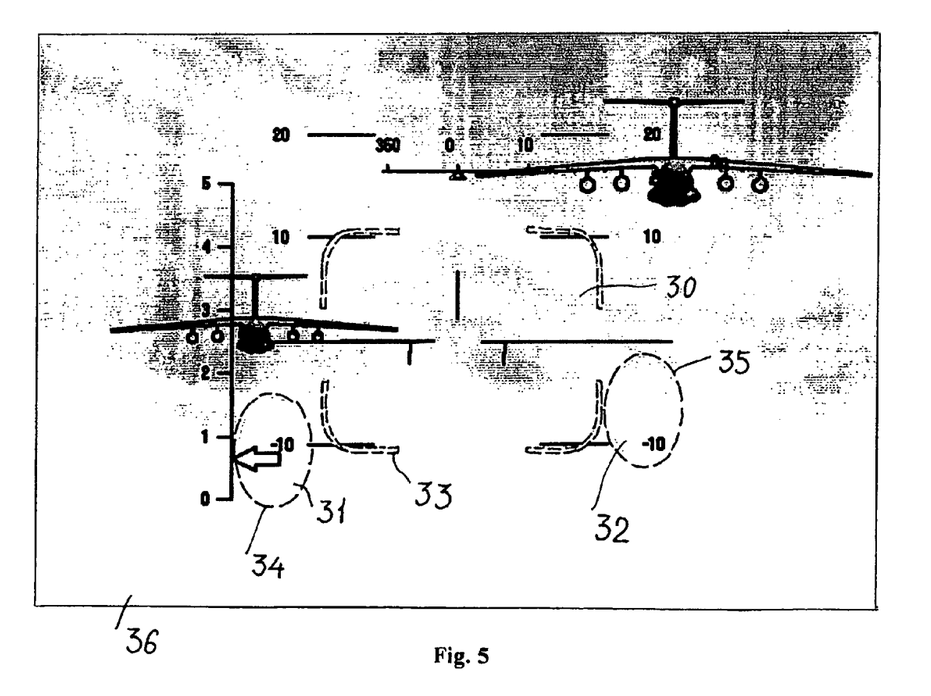
FIG. 5 is the schematic form of information, visualized in subsystem of the user according to the invention, variant.

FIG. 5 demonstrates the scheme of the visualized information on the display of the navigation chart, which is usually used on board of the A/C for indication of the A/C heading and to display symbols generated by the airborne inertial navigation system, for example by the Airborne Inertial Navigation System (AINS), which displays the region 30 of the A/C forecasted positions (the AAFP) and danger areas 31 and 32 of the VG wake vortices at the forecasted time. Region 30 of the AAFP can have the form of a rectangle, which sizes are proportional to the dimensions of the region of possible location of the A/C body. The boundaries of the warning area 36 are not shown at the display as, according to the invention, it is appropriate to project on the display the wake vortex danger areas only when the danger areas 31 and 32 intersect the AA 33 simultaneously with indication, for example the sound one, of the event. The wake vortex danger areas 31 and 32 can have the form of a circle or other form convenient for visual perception of geometrical figures. Besides, the picture may be accompanied by visual indication, for example by light or by colors spread on the regions or on their boundaries 33, 34, and 35, respectively the region 30 of the AAFP and wake vortex danger areas 31 and 32.

According to the invention, it is appropriate to save the current information on the chosen delay time, coordinates of the control plane, area of the aircraft forecasted positions, vortex generator wake vortex danger areas within the emergency period of indication of the nulling event for the distance from the region of the aircraft forecasted positions to the vortex generator of wake vortex danger areas. This preservation can be provided with the help of a separate device for information storage (it is not shown on the drawings) placed on the aircraft board, for example in the system of the flight recorder (the so called "black box"), as well as in ground, sea, and space control facilities. The availability of such the information will make it possible implementation of the measures for elimination of the causes of air accidents, estimation of pilot's skill in the situation of occurrence of wake vortices in the vicinity area of the aircraft, when entering hazardous zones might cause the change of the aircraft configuration or of its path.

Of course, though the given example contains only one generator of wake vortices and indication of behavior for only one danger area of the VG wake vortices, the calculations and tracking of GV wake vortices are carried out with respect to all VG located in the aircraft vicinity, and the areas of only danger VG wake vortices are visualized on the display. Based on the evaluation of the scheme of location of potentially hazardous zones on the display made by the pilot, the adequate decision could be made on the adequate evasion maneuver of the aircraft.

The subsystem 4 for warning of the possible encounter of the A/C with the VG wake vortex danger areas, according to the invention, may be realized by means of standard airborne and ground equipment, for example the A/C Airborne Internal Navigation System (AINS), Air Data Computer System (ADC), Doppler System (DS), Forward View Radar (FVR) and the use of information coming from an Air Traffic Control (ATC) system, the United Indication System (UIS), from the Information Exchange Multiplex Channel (IEMC), and also from informational systems compatible with the above mentioned systems used on board aircraft of other countries, for example the Collision Avoidance System (TCAS), Traffic Alert, USA.

Moreover, the devices of the integrated systems, according to the invention, may be located separately on different objects of Air Traffic Control systems or on different A/C or VG providing the user with information on the results of operational calculations by means of their indication and visualization. The users of such information could be A/C crews, as well as air traffic control services of aerodromes and ships consulting A/C crews during flights about the recommended path or maneuver to avoid dangerous flight situation, which is of utmost importance under low visibility and difficult weather conditions.

Aviation science community and specialists in avionics should clearly see that the integrated wake safety system, according to the invention, realizes the comprehensive approach to the aircraft flight safety problem and is applicable during cruise flight, as well as during take-off and landing.

The user subsystem placed on A/C board, as well as at the flight controller site provides the current correction of information at the disposal of the flight controller and may provide current correction of the available information on the vortex situation in the area of landing or take-off, which enable to provide safety takeoff and landing operations and to reduce the time separations between aircraft during takeoff and landing.

Moreover the use of integrated safety system according to the invention allows reducing the burden of a flight controller who formulates the instructions for pilots, as the responsibility for the decision on an avoidance maneuver is on pilots who receive additional information simplifying the decision making. One should bear in mind, that in any way, at present the pilot takes the risk of decision making without using the integrated vortex safety system, according to the invention, but without information the wake vortex danger areas positions.

Aviation science community and specialists in avionics should clearly see that the integrated vortex safety system according to the invention may include improvements and perfections within the scope of the invention claims and subject associated with different conditions of the system operation, as well as with improvement of navigation and information systems. For example, one can use different calculation algorithms most closely corresponding to operations of the system, apply different approaches to indication and visualization of the user information that could improve adequacy of the user perception, incorporate the use of different information flows, etc.

It should be clear for specialists of the air traffic control that the Integrated Vortex Safety System, according to the invention, can be realized also for execution of the functions of air traffic control, as some vortex situations in the vicinity of ground and flying VG may be solved by means of warning systems placed stand alone on board of aircraft, ships, at aerodromes combined into a united informational system preventing occurrence of hazard situations related to A/C encountering different VG wake vortex danger areas. The class of possible VG includes aircrafts of different types, for example airplanes, helicopters, unmanned aerial vehicles, sea ships including aircraft carriers, as well as ground structures and other objects.

INDUSTRIAL APPLICABILITY

It is appropriate to realize the Integrated System for Aircraft Vortex Safety, according to the invention, in the form of programs adapted to a certain type of A/C, to A/C operational conditions and type of equipment and compatible with informational systems of air traffic control.

The Integrated Vortex Safety System, according to the invention, can be easily realized by means of the well known devices, the system can be mounted on different aircraft, as well as in various simulators for training pilots and flight controllers in activities under wake vortex danger.

What we claim:

1. An integrated system for aircraft vortex safety, comprising:
   an informational subsystem of an aircraft parameters capable of receiving, saving and providing the user with information on the aircraft configuration, position, flight velocity, and attitude;
   an informational subsystem of vortex generators capable of receiving, saving and providing the user with information from different available sources on vortex generator configuration, position, flight velocity, and attitude for all vortex generators located in the aircraft vicinity;
   an informational subsystem of ambient parameters capable of receiving, saving and providing the user with information on ambient conditions in the aircraft vicinity at current and forecasted time moments;
   a subsystem warning the user against a risk of the aircraft encounter with vortex generator wake vortices at the forecasted time;
   a user subsystem capable of receiving, saving and providing the user with information from other subsystems and forming an instructive signal for the aircraft evasion maneuver ensuring aircraft evasion from a vortex generator danger areas during a chosen danger criterion by the user delay time after the user receives the warning signal about a risk of the aircraft encounter with vortex generator wake vortices at the forecasted time;
   a communication subsystem ensuring integration of the subsystems into a united complex, and
   said informational subsystem of the aircraft parameters ensures receipt, processing, saving, and transmitting information to the warning subsystem at least on the aircraft configuration, coordinates and attitude in the inertial frame, on the aircraft velocity and angular rate components in the aircraft frame;
   said informational subsystem of vortex generators ensures receipt, processing, saving, and transmitting information to the user at least on the vortex generator types, coordinates and attitude, velocity and angular rate components in the inertial frame;
   said informational subsystem of ambient parameters ensures receipt, processing, saving, and transmitting information to the user at least on a wind velocity components in the inertial frame at different attitudes in the region of the wake vortex presence, as well as on an ambient turbulence;
   said warning subsystem informing the user on a possibility of the aircraft encountering with the vortex generator danger areas performs at least calculation of the vortex generator wake vortex position, and intensity, and danger areas, the area of the aircraft forecasted positions at the forecasted time and directs to the user subsystem information on a possibility of the aircraft encountering with the vortex generator wake vortex danger areas at the forecasted time; and
   said user subsystem receives, processes, saves and indicates the information from the warning subsystem at least on a nulling of the distance from the area of the aircraft forecasted positions to the vortex generator wake vortex danger area at the forecasted time and forms a signal indicating the change of the aircraft position providing the increase of the above mentioned distance;
   wherein said warning subsystem informing the user on the possibility of the aircraft encountering with the vortex generator wake vortex danger areas at the forecasted time includes a system comprising:
   an aircraft parameters tracker capable of receiving information on the aircraft configuration, position, coordinates, and attitude in the inertial frame at the current time;
   a vortex generator tracker capable of receiving information on the vortex generator position, geometrical and weight characteristics, as well as on the motion parameters in the inertial frame at the current time;
   a memory unit capable of saving information on the vortex generator position and motion parameters in the inertial frame;
   an ambient parameters detector capable of receiving information on the environmental parameters in the space of the collocation of the aircraft and vortex generator at the current time;
   a wake vortex tracker capable of determining the vortex generator wake vortices in the form of a set of the voracity center paths in the inertial frame;
   a memory device capable of storing information on the vortex generator wake vortex path point coordinates in the form of the set of the vorticity region centers and wake vortex intensity in the inertial frame;
   a device for selection of a delay time capable of calculating the time period within which the aircraft has at least a possibility of a flight evasive maneuver providing evasion of the aircraft from the generator wake danger area after the signal warning against the possibility of wake encounter has been received;
   a device for simulation of a control plane capable of calculating the delay distance, which equals to the distance covered by the aircraft during the delay time, modeling the control plane situated in front of the aircraft perpendicular to its flight direction at the delay distance, and determining the forecasted time necessary for the aircraft to gain the control plane in the inertial frame;
   a device for determination of the danger area parameters capable of determining the geometrical characteristics of the generator wake vortex danger areas in the form of the set of the danger areas of the generator vorticity regions at the forecasted time;
   a forecasting device capable of determining the generator wake path in the form of the set of the generator vorticity region centers with respect to the inertial frame and of the intensity of the generator wake vortices at the forecasted time;
   a device for calculation of the intersection points capable of determining the coordinates of the intersection points of a generator wake vortex trajectory and the control plane at the forecasted time of the aircraft flight through it;
   an areas and regions forming device capable of forming around the intersection point of the wake vortex path and the control plane of the wake vortex danger area in the form of a set of the generator voracity danger areas, where the entering aircraft may have a flight parameter exceeding the admissible limits, forming in the control plane of the area of the aircraft forecasted positions at the forecasted time of the aircraft intersection with the control plane with due regard to flight regulations, forming around the region of the aircraft forecasted positions of an alert area, the information on the entrance of the wake danger areas into the warning area will be provided to the user;

a transformation unit capable of calculating the coordinates of the area of the aircraft forecasted positions, of the warning area and of the wake vortex danger area in the aircraft frame;

a first intersection conditional test unit capable of calculating the distance from the alert area to the wake vortex danger area and marking its nulling;

a second intersection conditional test unit capable of calculating the distance from the area of the aircraft forecasted positions to the wake vortex danger area and marking its nulling;

a first indication unit capable of forming and transmitting the nulling signal for the distance from the area of the aircraft forecasted positions to the vortex generator wake vortex danger area; and a second indication unit capable of indicating the nulling of the distance from the warning area to the to the vortex generator wake vortex danger area.

2. The system as claimed in claim 1, wherein:

said aircraft informational subsystem is realized on the basis of the aircraft standard onboard equipment and/or equipment of ground-based, seaborne and/or aerospace navigation complexes;

said vortex generator informational subsystem is realized on the basis of the aircraft standard onboard equipment and/or a vortex generator standard equipment, and/or equipment of the air traffic control for ground, sea, or aerospace complexes;

said environmental informational subsystem is realized on the basis of the aircraft standard onboard equipment and/or of standard meteorological equipment for the air traffic control system or of equipment in the ground-based, sea and/or aerospace navigation complexes;

said warning subsystem informing the user on the possibility of the aircraft encountering with the vortex generator wake vortex danger areas is realized on the basis of a user computer software and/or onboard unified indication systems and/or indication systems of air traffic control services or ground-based equipment in seaborne and/or aerospace navigation complexes at a site of a flight controller;

said user subsystem is realized on the basis of the user computer and navigational systems belonging to the aircraft onboard standard equipment and/or ground-based or seaborne navigation complexes at the site of the flight controller; and said commutation subsystem is realized on the basis of data-transmission communication systems and/or onboard multiplex channels of informational exchange, and the user is the aircraft and/or the air traffic control services and the instructive signal is realized in the aircraft flight control system.

3. The system as claimed in claim 1, wherein:

said aircraft parameters tracker is capable of receiving information at least on the aircraft configuration, coordinates, flight velocity, pitch, yaw and roll angles; said vortex generator tracker is capable of receiving information at least on the vortex generator type, flight, velocity, angular rates, and coordinates of the generator path points;

said ambient parameters detector is capable of receiving information at least on the magnitude and direction of the local wind velocity, the attitude, wind profile, ambient turbulence intensity, and the underlying terrain type;

said wake vortex tracker is capable of determining the vortex generator wake vortex path in the form of the set of the generator voracity area centers and the wake vortex intensity on the basis of the saved information on the vortex generator type, velocity, angular rates, and coordinates of the generator path points;

said device for simulation of a control plane is capable of modeling the control plane on the basis of the information on the aircraft position, attitude, velocity, and the delay time;

said device for determination of the danger area parameters is capable of determining the geometrical characteristics of the generator wake vortex danger areas on the basis of the saved information on a set of the trajectory point coordinates and intensity of the generator wake vortices, as well as of the information on the aircraft configuration, position, velocity, and angular rates in the inertial frame;

said forecasting device is capable of determining the vortex generator wake vortex path and intensity on the basis of the information on the wake path in the form of a set of trajectories of the generator vorticity region centers in the inertial frame and of the wake intensity;

said device for calculation of the intersection points is capable of determining the coordinates of the intersection points of the generator wake vortex trajectory and the control plane on the basis of the information on the coordinates of the control plane and the wake vortex trajectory in the inertial frame at the forecasted time of the aircraft flight through it;

said areas and regions forming device is capable of forming the wake vortex danger area, area of the aircraft forecasted positions and the alert area on the basis of the information of the coordinates of the intersection point of the generator wake vortex path and the control plane at the forecasted time, of the information on the geometrical characteristics of the danger area in the form of the set of the generator vorticity danger areas, of the information on the aircraft position, attitude, velocity and angular rates with due regard for the flight regulations in the inertial frame; and said transformation unit is capable of calculating the coordinates of the area of the aircraft forecasted positions, of the alert area, and of the wake vortex danger area in the aircraft frame on the basis of information on the coordinates of the area of the aircraft forecasted positions, of the alert area, and of the wake vortex danger area, as well as of information on the aircraft coordinates and attitude, preferably on the pitch, yaw and roll angles in the inertial frame at the current time.

4. The system as claimed in claim 1, wherein said warning subsystem comprises:

said vortex generator tracker;

said memory unit;

said wake vortex tracker;

said device for determination of the danger area parameters;

said forecasting device;

said device for calculation of the intersection points;

said areas and regions forming device;

said first and second units testing the intersection conditions; and signal devices capable of simultaneous functioning with respect of each of said vortex generators located in the vicinity of the aircraft.

5. The system as claimed in claim 4, wherein said warning subsystem includes a device for determination of the vortex generator danger area parameters, said device comprising:

- a unit for an aircraft schematization capable of calculating the set of the aircraft geometrical characteristics necessary for evaluation of additional aerodynamic forces and moments induced by the generator wake vortices and acting on the aircraft on the basis of information on the aircraft configuration, coordinates, flight velocity, angles of pitch, yaw and roll;
- a unit for evaluation of additional aerodynamic forces and moments acting on the aircraft at a given point and induced by the generator wake vortices, capable of calculating them on the basis of the saved information on the paths of the wake vortex points in the form of a set of trajectories of the voracity area centers and the intensity of the generator wake vortices in the inertial frame, of the information on the aircraft configuration, position, flight velocity, angular rate in the inertial frame, and on the aircraft geometry;
- a unit for estimation of a hazard level of the aerodynamic perturbations at the given point capable of estimating the hazard level on the basis of criteria chosen by the user;
- a unit for determination of the points where the aircraft aerodynamic forces and moments induced by the generator wake vortices are dangerous capable of determining the coordinates of the points of the danger areas on the basis of their selection under the hazard criteria chosen by the user; and
- a unit for evaluation of the geometrical characteristics of the wake vortex danger areas capable of calculating them on the basis of information on the coordinates of points of the danger areas.

6. The system as claimed in claim 5, wherein said unit for determination of the wake vortex danger area geometrical characteristics in said warning subsystem in a device for determination of the danger area parameters is capable of approximating the danger area boundary.

7. The system as claimed in claim 1, wherein said device for selection of the delay time in the warning subsystem is realized with the possibility of the current correction of the delay time, said areas and regions forming device realized with the possibility of the current correction of the coordinates of the area of the aircraft forecasted positions and with the possibility of the current correction of the coordinates of the alert area, and said corrections are carried out in a manual, semiautomatic, or automatic mode.

8. The system as claimed in claim 7, wherein said warning subsystem includes a device for determination of the vortex generator danger area parameters, said device comprising:

- a unit for an aircraft schematization capable of calculating the set of the aircraft geometrical characteristics necessary for evaluation of additional aerodynamic forces and moments induced by the generator wake vortices and acting on the aircraft on the basis of information on the aircraft configuration, coordinates, flight velocity, angles of pitch, yaw and roll;
- a unit for evaluation of additional aerodynamic forces and moments acting on the aircraft at a given point and induced by the generator wake vortices, capable of calculating them on the basis of the saved information on the paths of the wake vortex points in the form of a set of the trajectories of the vorticity area centers and the intensity of the generator wake vortices in the inertial frame, of the information on the aircraft configuration, position, flight velocity, angular rate in the inertial frame, and on the aircraft geometry;
- a unit for estimation of a hazard level of the aerodynamic perturbations at the given point capable of estimating the hazard level on the basis of criteria chosen by the user;
- a unit for determination of the points where the aircraft aerodynamic forces and moments induced by the generator wake vortices are dangerous capable of determining the coordinates of the points of the danger areas on the basis of their selection under the hazard criteria chosen by the user; and
- a unit for evaluation of the geometrical characteristics of the wake vortex danger areas capable of calculating them on the basis of information on the coordinates of points of the danger areas.

9. The system as claimed in claim 8, wherein said unit for determination of the wake vortex danger area geometrical characteristics in said warning subsystem in a device for determination of the danger area parameters is capable of approximating the danger area boundary.

10. The system as claimed in claim 1, wherein said user subsystem comprises a device for visualization for the user of information on the location of the area of the aircraft forecasted positions and the vortex generator wake danger areas in a control surface.

11. The system as claimed in claim 10, wherein said warning subsystem includes a device for determination of the vortex generator danger area parameters, said device comprising:

- a unit for an aircraft schematization capable of calculating the set of the aircraft geometrical characteristics necessary for evaluation of additional aerodynamic forces and moments induced by the generator wake vortices and acting on the aircraft on the basis of information on the aircraft configuration, coordinates, flight velocity, angles of pitch, yaw and roll;
- a unit for evaluation of additional aerodynamic forces and moments acting on the aircraft at a given point and induced by the generator wake vortices, capable of calculating them on the basis of the saved information on the paths of the wake vortex points in the form of a set of trajectories of the voracity area centers and the intensity of the generator wake vortices in the inertial frame, of the information on the aircraft configuration, position, flight velocity, angular rate in the inertial frame, and on the aircraft geometry;
- a unit for estimation of a hazard level of the aerodynamic perturbations at the given point capable of estimating the hazard level on the basis of criteria chosen by the user;
- a unit for determination of the points where the aircraft aerodynamic forces and moments induced by the generator wake vortices are dangerous capable of determining the coordinates of the points of the danger areas on the basis of their selection under the hazard criteria chosen by the user; and
- a unit for evaluation of the geometrical characteristics of the wake vortex danger areas capable of calculating them on the basis of information on the coordinates of points of the danger areas.

12. The system as claimed in claim 11, wherein a unit for determination of the wake vortex danger area geometrical characteristics in said warning subsystem in said device for determination of the danger area parameters is capable of approximating the danger area boundary.

13. The system as claimed in claim 1 wherein said user subsystem comprises an indication device and an alarm indication device chosen from the group consisting of visual, audio and tactile indication devices.

14. The system as claimed in claim 13, wherein said warning subsystem includes a device for determination of the vortex generator danger area parameters, said device comprising:
- a unit for an aircraft schematization capable of calculating the set of the aircraft geometrical characteristics necessary for evaluation of additional aerodynamic forces and moments induced by the generator wake vortices and acting on the aircraft on the basis of information on the aircraft configuration, coordinates, flight velocity, angles of pitch, yaw and roll;
- a unit for evaluation of additional aerodynamic forces and moments acting on the aircraft at a given point and induced by the generator wake vortices, capable of calculating them on the basis of the saved information on the paths of the wake vortex points in the form of a set of trajectories of the voracity area centers and the intensity of the generator wake vortices in the inertial frame, of the information on the aircraft configuration, position, flight velocity, angular rate in the inertial frame, and on the aircraft geometry;
- a unit for estimation of a hazard level of the aerodynamic perturbations at the given point capable of estimating the hazard level on the basis of criteria chosen by the user;
- a unit for determination of the points where the aircraft aerodynamic forces and moments induced by the generator wake vortices are dangerous capable of determining the coordinates of the points of the danger areas on the basis of their selection under the hazard criteria chosen by the user; and
- a unit for evaluation of the geometrical characteristics of the wake vortex danger areas capable of calculating them on the basis of information on the coordinates of points of the danger areas.

15. The system as claimed in claim 14, wherein said unit for determination of the wake vortex danger area geometrical characteristics in said warning subsystem in a device for determination of the danger area parameters is capable of approximating the danger area boundary.

16. The system as claimed in claim 1, wherein an aircraft admissible roll is chosen as a hazard criterion for the vortex generator wake vortices.

17. The system as claimed in claim 16, wherein said warning subsystem includes a device for determination of the vortex generator danger area parameters, said device comprising:
- a unit for an aircraft schematization capable of calculating the set of the aircraft geometrical characteristics necessary for evaluation of additional aerodynamic forces and moments induced by the generator wake vortices and acting on the aircraft on the basis of information on the aircraft configuration, coordinates, flight velocity, angles of pitch, yaw and roll;
- a unit for evaluation of additional aerodynamic forces and moments acting on the aircraft at a given point and induced by the generator wake vortices, capable of calculating them on the basis of the saved information on the paths of the wake vortex points in the form of a set of trajectories of the voracity area centers and the intensity of the generator wake vortices in the inertial frame, of the information on the aircraft configuration, position, flight velocity, angular rate in the inertial frame, and on the aircraft geometry;
- a unit for estimation of a hazard level of the aerodynamic perturbations at the given point capable of estimating the hazard level on the basis of criteria chosen by the user;
- a unit for determination of the points where the aircraft aerodynamic forces and moments induced by the generator wake vortices are dangerous capable of determining the coordinates of the points of the danger areas on the basis of their selection under the hazard criteria chosen by the user; and
- a unit for evaluation of the geometrical characteristics of the wake vortex danger areas capable of calculating them on the basis of information on the coordinates of points of the danger areas.

18. The system as claimed in claim 17, wherein said unit for determination of the wake vortex danger area geometrical characteristics in said warning subsystem in a device for determination of the danger area parameters is capable of approximating the danger area boundary.

19. The system as claimed in claim 1, wherein the aircraft rolling moment induced by the vortex generator wake vortices is chosen as the hazard criterion for the vortex generator wake vortices.

20. The system as claimed in claim 19, wherein said warning subsystem includes a device for determination of the vortex generator danger area parameters, said device comprising:
- a unit for an aircraft schematization capable of calculating the set of the aircraft geometrical characteristics necessary for evaluation of additional aerodynamic forces and moments induced by the generator wake vortices and acting on the aircraft on the basis of information on the aircraft configuration, coordinates, flight velocity, angles of pitch, yaw and roll;
- a unit for evaluation of additional aerodynamic forces and moments acting on the aircraft at a given point and induced by the generator wake vortices, capable of calculating them on the basis of the saved information on the paths of the wake vortex points in the form of a set of trajectories of the voracity area centers and the intensity of the generator wake vortices in the inertial frame, of the information on the aircraft configuration, position, flight velocity, angular rate in the inertial frame, and on the aircraft geometry;
- a unit for estimation of a hazard level of the aerodynamic perturbations at the given point capable of estimating the hazard level on the basis of criteria chosen by the user;
- a unit for determination of the points where the aircraft aerodynamic forces and moments induced by the generator wake vortices are dangerous capable of determining the coordinates of the points of the danger areas on the basis of their selection under the hazard criteria chosen by the user; and
- a unit for evaluation of the geometrical characteristics of the wake vortex danger areas capable of calculating them on the basis of information on the coordinates of points of the danger areas.

21. The system as claimed in claim 20, wherein said unit for determination of the wake vortex danger area geometrical characteristics in said warning subsystem includes a device for determination of the danger area parameters is capable of approximating the danger area boundary.

22. The system as claimed in claim 1, wherein said wake vortex tracker and said forecasting device in said warning subsystem comprise a programmable component, and said device for determination of the danger area parameters is realized in a programmable component software.

23. The system as claimed in claim 22, wherein said warning subsystem includes a device for determination of the vortex generator danger area parameters, said device comprising:

a unit for an aircraft schematization capable of calculating the set of the aircraft geometrical characteristics necessary for evaluation of additional aerodynamic forces and moments induced by the generator wake vortices and acting on the aircraft on the basis of information on the aircraft configuration, coordinates, flight velocity, angles of pitch, yaw and roll;

a unit for evaluation of additional aerodynamic forces and moments acting on the aircraft at a given point and induced by the generator wake vortices, capable of calculating them on the basis of the saved information on the paths of the wake vortex points in the form of a set of trajectories of the voracity area centers and the intensity of the generator wake vortices in the inertial frame, of the information on the aircraft configuration, position, flight velocity, angular rate in the inertial frame, and on the aircraft geometry;

a unit for estimation of a hazard level of the aerodynamic perturbations at the given point capable of estimating the hazard level on the basis of criteria chosen by the user;

a unit for determination of the points where the aircraft aerodynamic forces and moments induced by the generator wake vortices are dangerous capable of determining the coordinates of the points of the danger areas on the basis of their selection under the hazard criteria chosen by the user; and a unit for evaluation of the geometrical characteristics of the wake vortex danger areas capable of calculating them on the basis of information on the coordinates of points of the danger areas.

24. The system as claimed in claim 23, wherein said unit for determination of the wake vortex danger area geometrical characteristics in said warning subsystem in a device for determination of the danger area parameters is capable of approximating the danger area boundary.

25. The system as claimed in claim 1, wherein devices and units of said warning subsystem and said user subsystem have a different localization.

26. The system as claimed in claim 25, wherein said warning subsystem includes a device for determination of the vortex generator danger area parameters, said device comprising:
a unit for an aircraft schematization capable of calculating the set of the aircraft geometrical characteristics necessary for evaluation of additional aerodynamic forces and moments induced by the generator wake vortices and acting on the aircraft on the basis of information on the aircraft configuration, coordinates, flight velocity, angles of pitch, yaw and roll;

a unit for evaluation of additional aerodynamic forces and moments acting on the aircraft at a given point and induced by the generator wake vortices, capable of calculating them on the basis of the saved information on the paths of the wake vortex points in the form of a set of trajectories of the voracity area centers and the intensity of the generator wake vortices in the inertial frame, of the information on the aircraft configuration, position, flight velocity, angular rate in the inertial frame, and on the aircraft geometry;

a unit for estimation of a hazard level of the aerodynamic perturbations at the given point capable of estimating the hazard level on the basis of criteria chosen by the user;

a unit for determination of the points where the aircraft aerodynamic forces and moments induced by the generator wake vortices are dangerous capable of determining the coordinates of the points of the danger areas on the basis of their selection under the hazard criteria chosen by the user; and a unit for evaluation of the geometrical characteristics of the wake vortex danger areas capable of calculating them on the basis of information on the coordinates of points of the danger areas.

27. The system as claimed in claim 26, wherein said unit for determination of the wake vortex danger area geometrical characteristics in said warning subsystem in a device for determination of the danger area parameters is capable of approximating the danger area boundary.

28. The system as claimed in claim 1, wherein said user subsystem comprises a system for storage of information on the delay time, coordinates of a control surface, area of the aircraft forecasted positions and the vortex generator danger areas at least within the time of alarm indication of the nulling event for the distance from the area of the aircraft forecasted positions to the danger area of the vortex generator wake vortices.

29. The system as claimed in claim 28, wherein said warning subsystem includes a device for determination of the vortex generator danger area parameters, said device comprising:
a unit for an aircraft schematization capable of calculating the set of the aircraft geometrical characteristics necessary for evaluation of additional aerodynamic forces and moments induced by the generator wake vortices and acting on the aircraft on the basis of information on the aircraft configuration, coordinates, flight velocity, angles of pitch, yaw and roll;

a unit for evaluation of additional aerodynamic forces and moments acting on the aircraft at a given point and induced by the generator wake vortices, capable of calculating them on the basis of the saved information on the paths of the wake vortex points in the form of a set of trajectories of the voracity area centers and the intensity of the generator wake vortices in the inertial frame, of the information on the aircraft configuration, position, flight velocity, angular rate in the inertial frame, and on the aircraft geometry;

a unit for estimation of a hazard level of the aerodynamic perturbations at the given point capable of estimating the hazard level on the basis of criteria chosen by the user;

a unit for determination of the points where the aircraft aerodynamic forces and moments induced by the generator wake vortices are dangerous capable of determining the coordinates of the points of the danger areas on the basis of their selection under the hazard criteria chosen by the user; and a unit for evaluation of the geometrical characteristics of the wake vortex danger areas capable of calculating them on the basis of information on the coordinates of points of the danger areas.

30. The system as claimed in claim 29, wherein said unit for determination of the wake vortex danger area geometrical characteristics in said warning subsystem in a device for determination of the danger area parameters is capable of approximating the danger area boundary.

31. The system as claimed in claim 1, wherein said warning subsystem includes a device for determination of the vortex generator danger area parameters, said device comprising:
a unit for an aircraft schematization capable of calculating the set of the aircraft geometrical characteristics necessary for evaluation of additional aerodynamic forces and moments induced by the generator wake vortices and acting on the aircraft on the basis of information on the aircraft configuration, coordinates, flight velocity, angles of pitch, yaw and roll;

a unit for evaluation of additional aerodynamic forces and moments acting on the aircraft at a given point and induced by the generator wake vortices, capable of calculating them on the basis of the saved information on the paths of the wake vortex points in the form of a set of trajectories of the voracity area centers and the intensity of the generator wake vortices in the inertial frame, of the information on the aircraft configuration, position, flight velocity, angular rate in the inertial frame, and on the aircraft geometry;

a unit for estimation of a hazard level of the aerodynamic perturbations at the given point capable of estimating the hazard level on the basis of criteria chosen by the user;

a unit for determination of the points where the aircraft aerodynamic forces and moments induced by the generator wake vortices are dangerous capable of determining the coordinates of the points of the danger areas on the basis of their selection under the hazard criteria chosen by the user; and a unit for evaluation of the geometrical characteristics of the wake vortex danger areas capable of calculating them on the basis of information on the coordinates of points of the danger areas.

32. The system as claimed in claim 31, wherein said unit for determination of the wake vortex danger area geometrical characteristics in said warning subsystem in a device for determination of the danger area parameters is capable of approximating the danger area boundary.

* * * * *